United States Patent [19]

Falk et al.

[11] Patent Number: 4,797,843

[45] Date of Patent: Jan. 10, 1989

[54] PARALLEL OPTICAL ARITHMETIC/LOGIC UNIT

[75] Inventors: R. A. Falk, Renton; C. D. Capps, Seattle, both of Wash.

[73] Assignee: The Boeing Company, Seattle, Wash.

[21] Appl. No.: 19,767

[22] Filed: Feb. 27, 1987

[51] Int. Cl.[4] .................................... G06F 7/56

[52] U.S. Cl. .................................... 364/713

[58] Field of Search ............... 364/713, 746, 604, 606, 364/825-827, 822, 754; 350/3.7-3.73, 3.80-3.81, 503-504

[56] References Cited

U.S. PATENT DOCUMENTS

| | | | |
|---|---|---|---|
| 2,936,380 | 5/1960 | Anderson | 364/713 X |
| 3,614,192 | 9/1971 | Preston | 350/3.73 |
| 3,903,400 | 9/1975 | Nisenson | 364/713 |
| 4,042,814 | 8/1977 | Taylor | 364/713 |
| 4,074,361 | 2/1978 | Clow | 364/713 |
| 4,351,589 | 9/1982 | Chavel et al. | 364/713 X |

OTHER PUBLICATIONS

Szabó et al, "Residue Arithmetic and Its Applications to Computer Technology", McGraw-Hill Book Company, 1977.

Bleha et al, "Application of the Liquid Crystal Light Valve to Real-Time Optical Data Processing", *Opt. Eng.*, 17, p. 371.

"*Residue Arithmetic Techniques for Optical Processing of Adaptive Phased Array Radars*", *Beaudet et al, Applied Optics, 15 Sep. 1986.*

NASA Conference Publication 2302, Aug. 1983, Collins et al., "Optical Information Processing for Aerospace Applications II".

*Primary Examiner*—Gary V. Harkcom
*Assistant Examiner*—Tan V. Mai
*Attorney, Agent, or Firm*—Foley & Lardner, Schwartz, Jeffery, Schwaab, Mack, Blumenthal & Evans

[57] ABSTRACT

A parallel optical arithmetic/logic unit has inputs from point-light sources forming a given spatial pattern corresponding to a given separation of point sources. The spatial pattern is presented to a multiplicity of channels by an optical system formed of linear optical elements. A static filter is provided in each channel which allows energy to pass when it comes from one spatial pattern but attenuates or diverts energy from all other spatial patterns. Thus, energy will emerge predominantly from only one channel for each specific spatial pattern separated by a given separation of point sources. The desired output state of each channel may be detected to indicate the results of an optical arithmetic or logic operation.

20 Claims, 7 Drawing Sheets

FIG. 1.

| DECIMAL REPRESENTATION | "2 3 5" RESIDUE REPRESENTATION | | |
|---|---|---|---|
| 0 | 0 | 0 | 0 |
| 1 | 1 | 1 | 1 |
| 2 | 0 | 2 | 2 |
| 3 | 1 | 0 | 3 |
| 4 | 0 | 1 | 4 |
| 5 | 1 | 2 | 0 |
| 6 | 0 | 0 | 1 |
| 7 | 1 | 1 | 2 |
| 8 | 0 | 2 | 3 |
| 9 | 1 | 0 | 4 |
| 10 | 0 | 1 | 0 |
| 11 | 1 | 2 | 1 |
| 12 | 0 | 0 | 2 |
| ⋮ | | | |
| 27 | 1 | 0 | 2 |
| 28 | 0 | 1 | 3 |
| 29 | 1 | 2 | 4 |
| 30 | 0 | 0 | 0 |

| | | | |
|---|---|---|---|
| 1 | 1 | 1 | 1 |
| +2 | +0 | 2 | 2 |
| 3 | 1 | 0 | 3 |

| | | | |
|---|---|---|---|
| 9 | 1 | 0 | 4 |
| +3 | +1 | 0 | 3 |
| 12 | 0 | 0 | 2 |

| INPUT I 20 (T) | INPUT I 21 (F) | INPUT II 22 (F) | INPUT II 23 (T) | SPACING BETWEEN POINT SOURCES 20-23 | OUTPUT |
|---|---|---|---|---|---|
| ● | ○ | ○ | ● | 3d | T |
| ● | ○ | ● | ○ | 2d | F |
| ○ | ● | ○ | ● | 2d | F |
| ○ | ● | ● | ○ | 1d | F |

● - SOURCE ON
○ - SOURCE OFF

FIG. 6.

| RELATION | INPUT I (120) 2 | (121) 1 | (122) 0 | INPUT II (123) 0 | (124) 1 | (125) 2 | SPACING BETWEEN POINT SOURCES 120-125 | OUTPUT |
|---|---|---|---|---|---|---|---|---|
| 0+0=0 | ○ | ○ | ● | ● | ○ | ○ | 1d | 0 |
| 0+1=1 | ○ | ○ | ● | ○ | ● | ○ | 2d | 1 |
| 0+2=2 | ○ | ○ | ● | ○ | ○ | ● | 3d | 2 |
| 1+0=1 | ○ | ● | ○ | ● | ○ | ○ | 2d | 1 |
| 1+1=2 | ○ | ● | ○ | ○ | ● | ○ | 3d | 2 |
| 1+2=0 | ○ | ● | ○ | ○ | ○ | ● | 4d | 0 |
| 2+0=2 | ● | ○ | ○ | ● | ○ | ○ | 3d | 2 |
| 2+1=0 | ● | ○ | ○ | ○ | ● | ○ | 4d | 0 |
| 2+2=1 | ● | ○ | ○ | ○ | ○ | ● | 5d | 1 |

● – SOURCE ON
○ – SOURCE OFF

*FIG. 8.*

| RELATION | INPUT I 3 | 4 | 2 | 1 | INPUT 1 | 2 | 4 | 3 | SPACING BETWEEN POINT SOURCES | OUTPUT |
|---|---|---|---|---|---|---|---|---|---|---|
| 1 · 1 = 1 | ○ | ○ | ○ | ● | ● | ○ | ○ | ○ | 1d | 1 |
| 1 · 2 = 2 | ○ | ○ | ○ | ● | ○ | ● | ○ | ○ | 2d | 2 |
| 1 · 3 = 3 | ○ | ○ | ○ | ● | ○ | ○ | ○ | ● | 4d | 3 |
| 1 · 4 = 4 | ○ | ○ | ○ | ● | ○ | ○ | ● | ○ | 3d | 4 |
| 2 · 2 = 4 | ○ | ○ | ● | ○ | ○ | ● | ○ | ○ | 3d | 4 |
| 2 · 3 = 1 | ○ | ○ | ● | ○ | ○ | ○ | ○ | ● | 5d | 1 |
| 2 · 4 = 3 | ○ | ○ | ● | ○ | ○ | ○ | ● | ○ | 4d | 3 |
| 3 · 3 = 4 | ● | ○ | ○ | ○ | ○ | ○ | ○ | ● | 7d | 4 |
| 3 · 4 = 2 | ● | ○ | ○ | ○ | ○ | ○ | ● | ○ | 6d | 2 |
| 4 · 4 = 1 | ○ | ● | ○ | ○ | ○ | ○ | ● | ○ | 5d | 1 |

● – SOURCE ON

○ – SOURCE OFF

PARALLEL OPTICAL ARITHMETIC/LOGIC UNIT

BACKGROUND OF THE INVENTION

This invention relates generally to optical information processing, and in particular, to a parallel optical system for performing parallel optical arithmetic and logic operations.

There is a fundamental difference between optical circuits in which the information carriers are photons and electronic circuits wherein the information carriers are electrons. In the former case, the carriers do not interact with each other while in the latter case they do. This means that in optical devices there exist interconnection possibilities that do not exist with electronic hardware, in particular, interconnected parallel architectures. Furthermore, after inputs are switched on in an optical parallel architecture, a desired output appears in the time it takes a photon to traverse the optical device. No faster computation time is possible.

The evolution of optical computing in general has progressed from the analog Fourier transform type of optical computing to recent advances in numerical digital optical computing. Residue arithmetic numerical optical computing has also been investigated based on the compatibility between the parallel nature of arithmetic operations in residue arithmetic and the parallel processing capability of optics.

Briefly, the aforementioned capabilities lie in the fact that residue arithmetic does not have a "carry" operation, that is, each "bit" in the representation is independent of the other. Thus, for example, addition in residue arithmetic of corresponding "bits" in two numbers can effectively be carried out by a device that is not connected to other "bits", but parallel to other bits. In residue arithmetic, each "bit" in a representation of a number is the decimal value of the number modulo the prime number corresponding to that position, called the "radix". Addition is the sum of corresponding representations of the number modulo the radix. FIG. 1 gives examples of residue arithmetic in a "235" representation where 2 is the prime number associated with the leftmost radix, 3 with the central radix, and 5 with the rightmost radix.

Recently, a parallel optical adder for implementing residue arithmetic was proposed by Collins, et al. in "Optical Information Processing For Aerospace Applications II," NASA Conference Publication 2302, Aug. 30–31, 1983, incorporated herein by reference. Collins, et al. use controlled diffraction gratings produced by interfering light from two single mode optical fibers to implement residue addition. Referring to FIG. 2*a*, Collins et al, show a system, designated generally by reference numeral 10, that is provided with numerical information through two groups A & B of optical fibers 11 with the fiber ends acting as point sources in the input plane Q. The central two fibers 11a and 11b represent zero in each group A & B, respectively. Numerical values for input A increase in one direction from the central axis 20 (positive y direction) while numerical values for input B increase in the opposite direction. Light from two illuminated fibers, one in group A and another in group B, passes through a collimating lens 13 to produce interfering plane waves at the input side of a liquid crystal light valve 15.

The light valve may, for example, be the Hughes liquid crystal light valve more particularly described in W.P. Bleha et al "Application of the Liquid Crystal Light Valve to Real-Time Optical Data Processing," *Opt. Eng.*, 17, p. 371.

The light valve 15 and its operation will be further described with reference to FIG. 2*b*. The control area 70 serves as an active area. An incident write beam 72 strikes a photosensitive CdS film (not shown) on the input side of the light valve 15. The CdS film allows the intensity of the write beam 72 to control the field produced across the liquid crystal layer. This in turn effects a change in the orientation of the liquid crystal molecules and hence provides control over their birefringence. This control is available at each of $600 \times 600$ image elements of the device simultaneously and independently. A polarized read beam 74 incident on the output side of light valve 15 is reflected by a dielectric mirror behind the liquid crystal layer. The intensity of the reflected beam 76 is thus controlled by the intensity of write beam 72 at any particular image element.

Thus, the interference pattern fringe spacing is a function of the distance between the illuminated fibers which, in terms of quantized units of fiber separation, is proportional to the sum of the two numbers represented by the corresponding fibers. For example, the distance between a fiber 11*c* representing the number 4 in Group A (four units from the 0 in Group A) and a fiber 11*d* representing the number 3 in Group B (three units from the 0 in Group B) is 8 units, seven units from the sum of 4 and 3, plus one unit representing the separation between the two 0's at 11*a* and 11*b*. On the output side of the light valve 15, light incident from a source 19 is directed toward the light valve via lens 25 to form the read beam 74 of FIG. 2*b*. This read beam is subsequently reflected by the dielectric mirror in light valve 15 and diffracted by the gratings resulting from the incident interference pattern on the light valve input side. The reflected and diffracted light is then focused through Fourier transform lens 25 onto Plane P into various diffracted orders of which only the $+1$ order is retained. The deflected distance from the z axis (i.e., along the y axis) of the diffracted spot 23 is proportional to the separation of the fibers 11 in the input plane. For example, the addition of two 0 inputs gives an output deflection of one unit. The deflected distance past this unit offset is equal to the sum of the two numbers represented by the fibers producing the initial diffraction grating, thereby yielding the result of residue operation.

SUMMARY OF THE INVENTION

It is an object of the present invention to provide an improved method and apparatus that can decrease the required processing time when using optics in parallel arithmetic and logic operations.

It is a further object of the present invention to provide a method and apparatus that will decrease the overall processing time of a parallel optical operation by using simple linear filters.

Other objects and advantages of this invention will become more apparent hereinafter in the specifications and drawings.

In accordance with the invention, mutually coherent light sources forming two separate channels of a parallel optical processor are arranged along a line and separated from each other by a predetermined distance. A first group of lenses in the same focal plane are placed one focal length away from the light sources. Fourier transform filters in the same focal plane are placed one focal length away from the first group of lenses. A second group of lenses in the same focal plane are placed one focal length away from the Fourier transform filters. Finally, a group of collectors in the same focal plane are placed one focal length away from the second group of lenses. One light source from each channel is turned on, thereby forming a spatial pattern which is presented to a multiple channel optical system comprising the first group of lenses, the Fourier transform filters and the second group of lenses. The optical system allows light energy from the two channels of light sources to emerge predominantly from only one of its channels. This one channel is received by a corresponding collector and is indicative of the desired output state.

BRIEF DESCRIPTION OF THE DRAWINGS

FIG. 1 is a table of examples of residue arithmetic in a "235" representation.

FIG. 6 is an input/output table for the parallel optical adder shown in FIG. 5.

FIG. 8 is an input/output table for the radix 5 multiplier shown in FIG. 7.

DETAILED DESCRIPTION OF THE PREFERRED EMBODIMENTS

Figure 2A:
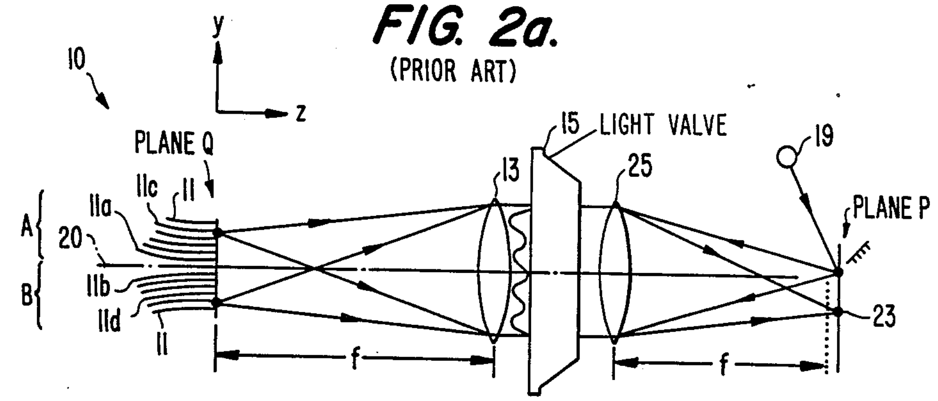
FIG. 2a. (PRIOR ART)
FIG. 2a is a schematic drawing of a parallel optical adder according to the prior art.
Figure 2B:
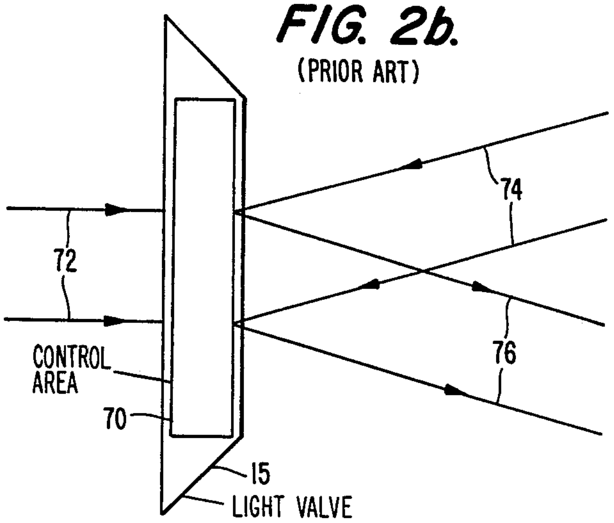
FIG. 2b. (PRIOR ART)
FIG. 2b is a schematic drawing of the liquid crystal light valve of the parallel optical adder according to the prior art.
Figure 3:
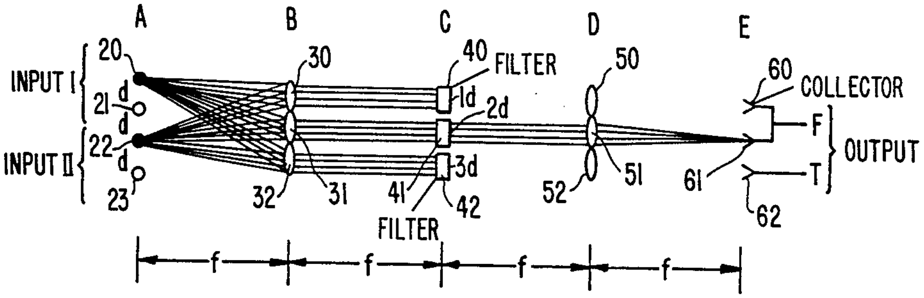
FIG. 3 is a schematic drawing of a parallel optical logical unit in its AND form according to the present invention.
Figures 4, 5:
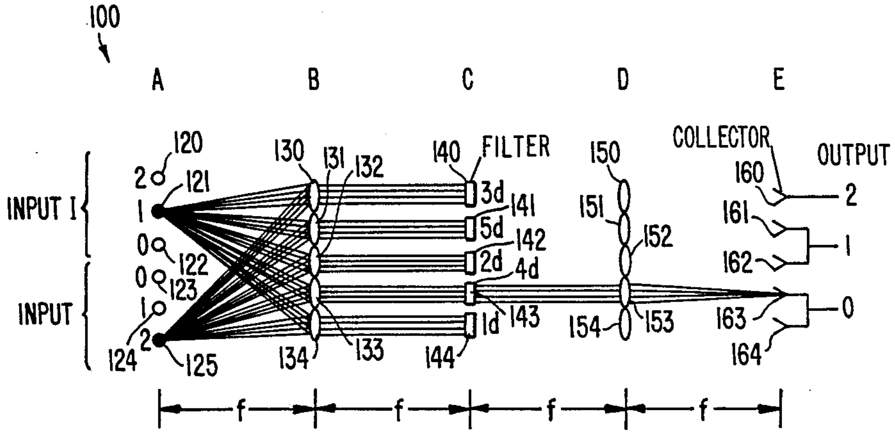
FIG. 4 is a truth table for the parallel optical logic unit shown in FIG. 3.
FIG. 5 is a schematic drawing of a parallel optical radix 3 adder according to the present invention.

Referring now more particularly to FIG. 3, the basic operation of the invention can most easily be illustrated in its AND logic unit form. Four mutually coherent point sources 20–23 that can be individually turned on or off are provided in a spaced relationship along a plane A. Source 20 is the "true" source and source 21 is the "false" source thereby forming Input I. Source 22 is the "false" source and source 23 is the "true" source of Input II. The sources 20–23 are arranged along a line and separated by equal distances d. Lens 30–32 are placed along the same focal plane B one focal length f away from the sources 20–23 to produce Fourier transforms of the source configuration generated when one of the sources is turned on from each of Input I and Input II. The Fourier transforms are produced along focal Plane C one focal length away from lenses 30–32 where Fourier transform filters 40–42 are located. It is a well-known property of the Fourier transform that, apart from an overall phase, the transform depends only on the structure of the pattern, not its absolute location. Thus, sources a distance 2d apart will produce the same transform, whether the sources 20 and 22 are on, or sources 21 and 23 are on. FIG. 4 shows the four possible input patterns, the spacing between sources for each of the patterns and the desired output state.

By way of example, as shown in FIG. 3, light from source 20 of Input I and source 22 of Input II passes with highest transmission through the filter 41 labeled "2d" as the sources 20 and 22 are a distance "2d" apart. This energy is collected by the lenses 50 to 52 in the lens array along focal plane D located one focal length away from filters 40 to 42. The energy allowed to pass through lenses 50–52 is then focused onto light collectors 60 to 62 (e.g., square law devices) located in Plane E one focal length away from lenses 50 to 52. The maximum intensity, by at least a two-to-one margin, will fall on collector 61. Thresholding (not shown) will then allow energy to pass through only one channel, the one corresponding to the correct answer. The collector 61, behind the "2d" filter 41, is connected to designate a "false" output. Thus, a "true-false" input, i.e., source 20 and 22 on, results in a "false" output, as required by the truth table in FIG. 4. Further, the filter 41 passes light resulting from the other possible "2d" configuration in which only sources 21 and 23 are on, corresponding to a "false-true" input condition. In this case, a "false" output designation likewise results from collector 61. Similarly, the "1d" channel passing through filter 40 and lens 50 leads to a "false" output. However, light from the "3d" channel passes through filter 42 and lens 52 and is directed to collector 62 designating a "true" output. The collectors 60 to 62 in Plane E can be either detectors if an electronic output is desired, or optical non-linear devices (e.g., optical bistable switches) for an optical output. Thus, an optical light valve is not required for the invention to perform its function.

The invention may be extended to take the form of a fully parallel adder by combining the same type of hardware used in the AND unit with the concept of residue arithmetic. Given a linear source configuration of point sources 120 to 125, analogous to that shown in FIG. 3, the adder 100 for radix 3 is shown in FIG. 5, and incorporates the input/output relationships shown in FIG. 6. The realization of the adder for radix 3 with the example $1+2=0$, illustrated in FIG. 5, is similar in construction to the AND logic unit of FIG. 3 with the labels d, f, A, B, C, D and E referring to the same items as in FIG. 3. As representative examples, focal length f is 200 mm and the distance d between point sources is 125 microns.

Referring to FIG. 5, point sources 120–122 make up one channel labeled "Input I" while sources 123–125 make up the second channel "Input II". Lenses 130–134 lie along focal plane B one focal length f away from the sources positional in plane A. Fourier filters 140–144 lie along focal plane C one focal length away from lenses 130–134 in plane B. Lenses 150–154 lie along focal plane D one focal length away from filters 140–144. Detectors 160–164 lie along focal plane E one focal length away from lenses 150–154. Thus, since the spacing between source 121 and source 125 is 4d, filter 143 and lens 153 allow the maximum intensity of light to emerge, thereby indicating an output of 0.

The geometric relationship between the inputs and the addition result can be generalized as follows. The addition of any two numbers in the radix, $n_1$ from input I and $n_2$ from input II, is related to the spacing between the two sources in the input pattern indicative of $n_1$ and $n_2$. Thus, in residue addition, $(n_1+n_2)$ modulo p, where p is the radix, corresponds to the spacing between $n_1$ and $n_2$ according to the relationship $(n_1+n_2+1)d$. Furthermore, the radix p adder requires $2p-1$ linear optical elements in each focal plane B, C, and D.

The invention can also take the form of a multiplier. In this form it exploits the property of residue arithmetic that the nonzero numbers in radix p, where p is a prime number, form a closed set under the multiplication operation. Practically, this means that an N×N multiplication table has only N entries, rather than $N^2$ as in ordinary multiplication, so that only order N, rather than $N^2$, filters are required for selection of the appropriate final state. This greatly simplifies the construction of the device. The implementation of this relationship is basically the same as the adder of FIG. 5. However, for multiplication, the order of the input numbers is permuted as is discussed by Szabó, and R. I. Tanaka, *Residue Arithmetic and its Applications to Computer Technology,* McGraw-Hill, New York, 1977, incorporated herein by reference.

The permutation concept taught by Szabo et al will be described briefly with a radix 5 multiplier used as a specific example. Note that 0 is treated as a separate channel in the residue multiplier (i.e., see FIG. 7). The permutation required to transform the remainder of the inputs is based on the following rule. For any prime radix, p, a generator, x, exists such that the input order is 1, x, $x^2$, $x^3$, . . . $x^{p-2}$. Thus, if p=5 (radix 5 multiplier) then x can equal 2 or 3. If, for example, 2 is chosen, the permuted order of inputs is 1, 2, 4, 3.

Figure 7:
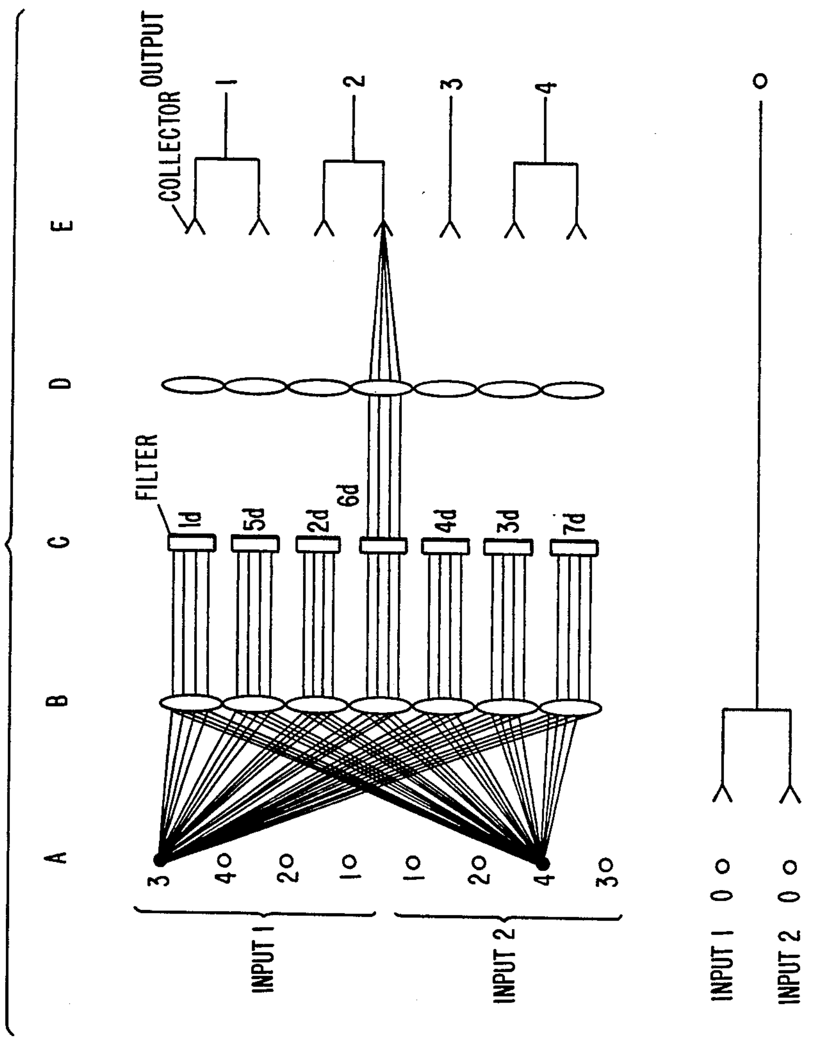
FIG. 7 is a schematic drawing of a parallel optical radix 5 multiplier according to the present invention.

The input/output table for a radix 5 multiplier is shown in FIG. 8 and the device which incorporates these relationships is shown in FIG. 7, where the reference letters d, f and A–E refer to the same items as in FIG. 3 and FIG. 5. Note that the only additional complications of the multiplier over that of the adder are that a separate channel must be included that allows light from zero entries to pass directly to the output and that a filter must discriminate against a single input, i.e., a nonzero number multiplied by zero, as well as incorrect spacing.

The geometrical relationship between the inputs and the multiplication result can be generalized as follows. The multiplication of any two numbers in the permuted input order, $x^{n}1$ from input I and $x^{n}2$, from input II, is related to the spacing between the two sources in the input pattern indicative of $x^{n}1$ and $x^{n}2$. Both $n_1$ and $n_2$ represent the position in Input I and II, respectively. For example, as shown in FIG. 7, the source for 1 in Input I corresponds to $n_1=0$ while the source for 4 in Input II corresponds to $n_2=2$. Thus, in residue multiplication, $(x^{n}1 \times x^{n}2)$ modulo p, corresponds to the spacing between $x^{n}1$ and $x^{n}2$ according to the relationship $(n_1+n_2+1)d$. Furthermore, a radix p multiplier requires 2p−3 linear optical elements in each plane B, C and D.

The present invention can likewise be extended to perform residue subtraction. Furthermore, the lenses in plane B might alternatively be replaced with a single spherical lens. Similarly, the lenses in plane D might alternatively be replaced by a single cylindrical lens. Finally, for ease of discussion, the invention has been described with reference to only two channels of light sources. However, the present invention could be extended for applications requiring three or more channels. The present invention achieves high-speed parallel optical arithmetic and logic operations without the use of slow optical light valves. Thus, the configuration of linear optical elements provides a novel high-speed parallel optical architecture.

Thus, although the invention has been described relative to specific embodiments thereof, it is not so limited in numerous variations and modifications thereof will be readily apparent to those skilled in the art in light of the above teaching. It is therefore to be understood that within the scope of the appended claims the invention may be practiced otherwise than as specifically described.

What is claimed is:

1. A method of performing parallel logic or arithmetic operations comprising the steps of:

(a) providing at least two channels of coherent light sources, all channels being arranged in a parallel fashion with each other and each channel having a plurality of coherent light sources aligned with one another at inputs to the channels;

(b) turning on one of the plurality of light sources in each channel whereby a specific spatial pattern is formed;

(c) inputting the specific spatial pattern to an optical system having a plurality of channels, each channel of the optical system having only a plurality of linear optical elements;

(d) passing light from the specific spatial pattern primarily through only one channel of the optical system, and (e) detecting the light that was passed through the one channel of the optical system and, thereby, recognizing the specific spatial pattern.

2. The method of performing parallel logic or arithmetic operations according to claim 1, wherein the specific spatial pattern detected is indicative of a result of the parallel logic or arithmetic operations.

3. The method of performing parallel logic or arithmetic operations according to claim 1, wherein the light sources are turned on and individually.

4. The method of performing parallel logic or arithmetic operations according to claim 1, wherein the light sources are mutually coherent.

5. A method of performing parallel logic or arithmetic operations in an optical system comprising the steps of:

(a) providing at least two channels of coherent light, all channels being arranged in a parallel fashion with each other and each channel having a plurality of coherent light sources aligned with one another at inputs to the channels;

(b) separating each light source from an adjacent light source by an equidistance d;

(c) separating each channel from an adjacent channel by the equidistance d;

(d) placing a first optical element in a first focal plane one focal length away from the plurality of light sources;

(e) placing a plurality of filters in a second focal plane one focal length away from the first optical element;

(f) placing a second optical element in a third focal plane one focal length away from the plurality of filters;

(g) placing a plurality of detectors in a fourth focal plane one focal length away from the second optical element; and (h) turning on one light source in each channel to form a spatial pattern.

6. The method of performing logic or arithmetic operations according to claim 5, further including the step of providing exactly two channels.

7. The method of performing logic or arithmetic operations according to claim 6, wherein the one coherent light source turned on in a first channel is separated from the one coherent light source turned on in a second channel by a distance (A×d) wherein A is an integer that indicates the number of equidistanced d spacings between the one coherent light source in the first channel and the one coherent light source in the second channel.

8. The method of performing logic or arithmetic operations according to claim 7 further including the step of detecting the distance (A×d) wherein the distance (A×d) is indicative of a result of the logic or arithmetic operation.

9. A method of performing logic or arithmetic operations according to claim 6 wherein residue addition of a radix p adder is performed further including the steps of:

(a) providing 2p light sources as said plurality of light sources; and (b) providing 2p−1 first lenses as said first optical element, 2p−1 filters as said plurality of filters, 2p−1 second lenses as said second optical element, and p detectors as said plurality of detectors.

10. A method of performing logic or arithmetic operations according to claim 6 wherein residue multiplication of a radix p multiplier further includes the steps of:

(a) providing 2p−1 light sources as said plurality of light sources; and (b) providing 2p−3 first lenses as said first optical element, 2p−3 filters as said plurality of filters, 2p−3 second lenses as said second optical element, and p detectors as said plurality of detectors.

11. The method of performing logic or arithmetic operations according to claim 5, wherein said first optical element includes a plurality of first lenses.

12. The method of performing logic or arithmetic operations according to claim 5, wherein said first optical element comprises a spherical lens.

13. The method of performing logic or arithmetic operations according to claim 5, wherein said second optical element includes a plurality of second lenses.

14. The method of performing logic or arithmetic operations according to claim 5, wherein said second optical element includes a cylindrical lens.

15. The method of performing logic or arithmetic operations according to claim 5, wherein the first and second optical element and the plurality of filters each comprise linear optical elements.

16. An apparatus for performing parallel logic or arithmetic operations, comprising:

an optical system having a first and second channel;

said first channel having a first plurality of coherent light sources aligned with one another at inputs to the first channel, each light source separated from an adjacent light source by an equidistance d and said first channel having one light source turned on;

said second channel having a second plurality of coherent light sources and separated from said first channel by said equidistance d, each light source of said second plurality of coherent light sources separated from an adjacent light source of said second plurality of coherent light sources by said equidistance d and said second channel having one light source turned on, wherein the light emerging from said first and second channels forms a specific spatial pattern;

an optical system for passing light from said specific spatial pattern through only one channel of said optical system, each optical system channel having a plurality of linear optical elements; and means for detecting light that was passed through the optical system and, thereby, recognizing the specific spatial pattern.

17. An apparatus as claimed in claim 16, wherein each channel of said optical system comprises:

a first optical element in a first focal plane one focal length away from said first and second channels of light sources;

a filter element in a second focal plane one focal length away from said first optical element; and a second optical element in a third focal plane one focal length away from said filter element.

18. An apparatus as claimed in claim 17, wherein said detecting means comprises a detector each channel of said optical system, each detector located in a fourth focal plane one focal length away from said second optical element.

19. An apparatus as claimed in claim 17, wherein said first optical element comprises a spherical lens.

20. An apparatus as claimed in claim 17, wherein said second optical element comprises a cylindrical lens.

* * * * *